June 3, 1969
W. E. DURNAN
3,447,820
COMPRESSION FITTING PARTICULARLY FOR FLUID-DISTRIBUTING SYSTEMS
Filed April 17, 1967
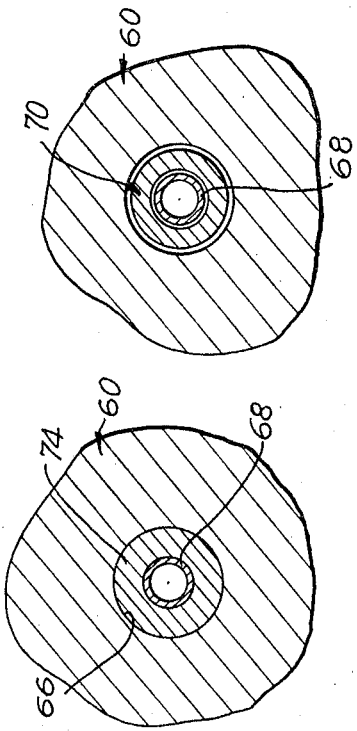
FIG. 4
FIG. 3
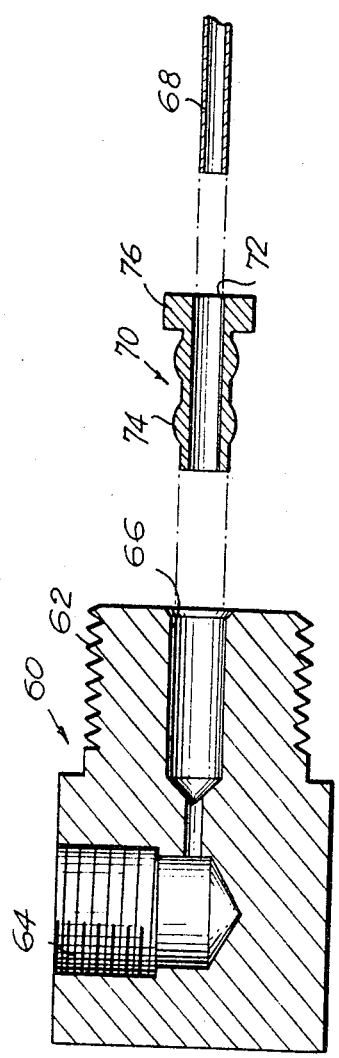
FIG. 1
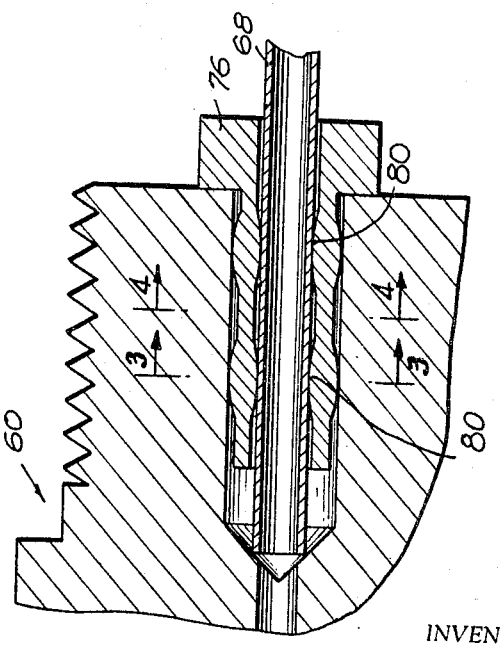
FIG. 2
INVENTOR.
WILLIAM E. DURNAN
BY
ATTORNEY United States Patent Office 3,447,820
Patented June 3, 1969

3,447,820
COMPRESSION FITTING PARTICULARLY FOR FLUID-DISTRIBUTING SYSTEMS
William E. Durnan, Rochelle Park, N.J., assignor to Auto Research Corporation, Boonton, N.J., a corporation of Delaware
Filed Apr. 17, 1967, Ser. No. 631,512
Int. Cl. F16l 21/04; F16b 7/04; F16j 15/50
U.S. Cl. 285—159
5 Claims

ABSTRACT OF THE DISCLOSURE

A compression fitting including a first cylindrical bore, an inner tubular member for conducting fluid, which member is to be coupled with said first bore, and a resilient compression sleeve having a bore through which said tubular member passes; the compression sleeve having on its interior two axially closely spaced annular outwardly projecting beads with an exterior diameter greater than the interior diameter of the wall of the first bore into which the sleeve is fitted, whereby the beads are deformed inward by the pressure exerted by the wall surrounding the first bore to form annular inwardly projecting beads in said sleeve and to cause said sleeve to deform outward between said beads.

Description of the invention

The present invention relates to fluid-distributing systems.

More particularly, the present invention relates to fittings which are adapted to form part of a conduit means of such a system. For example, the invention can be used in the lubrication of machinery where it is important to assure distribution of lubricant to a relatively large number of bearings.

In fluid-distributing systems of this type a considerable amount of trouble and expense is encountered in assembling the various componnets of the system, particularly in connection with the fititngs used with the tubes and the like which form the conduit system. Such a system will include not only simple tubes but also various metering devices which will provide continuously and automatically a proper rate of lubrication from a given central source.

Still further objects and advantages will appear in the more detailed description set forth below, it being understood, however, that this more detailed description is given by way of illustration and explanation only and not by way of limitation, since various changes therein may be made by those skilled in the art without departing from the scope and spirit of the present invention.

Primarily, it is an object of the invention to greatly simplify the connections between various components of a conduit system, particularly of the above type.

In particular, it is an object of the invention to provide an exceedingly effective compression type of fitting where parts are fixed to each other by compression of one member against another member.

In compression fittings of this latter type, it is conventional to provide a structure which axially compresses a compression member so as to tend to change the cross sectional configuration thereof and thus provide compression for fixing elements to each other. This requirement of axial forces which must be converted to radial compressive forces greatly complicates the conventional fittings in an undesirable manner.

It is therefore, one of the more specific and more important objects of the present invention to provide an exceedingly simple structure, far simpler than conventional structures of the above type, for producing a highly effective compression fitting.

In particularly, the objects of the present invention include a device which, when assembled in a quick and convenient manner, automatically results in the production of a compression fitting without the application of a force which is excessive.

Primarily, with the structure of the invention, the fitting includes an outer member formed with a bore and an inner tubular member extending with clearance into this bore. Surrounding the inner member within the bore of the outer member is a compression sleeve which has at its exterior a raised portion which is automatically deformed inwardly during introduction of this sleeve into the bore of the outer member. The inward deformation of the raised portion of the sleeve when it is introduced into the bore of the outer member deforms the inner surface of the sleeve, displacing a part of this inner surface inwardly against the exterior surface of the inner tubular member, so as to tightly press the sleeve not only against the inner tubular member but also against the outer member in the bore thereof. In this exceedingly simple manner a compression fitting according to the invention is provided.

Description of drawings

With the foregoing and other objects in view, the invention consists of the novel construction, combination and arrangement of parts as hereinafter more specifically described, and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views:

FIG. 1 is an exploded longitudinal section illustrating one possible embodiment of a compression fitting according to the invention;

FIG. 2 is a longitudinal section showing the parts of FIG. 1 when they are assembled;

FIG. 3 is a transverse section taken along lines 3—3 of FIG. 2 in the direction of the arrows;

FIG. 4 is a transverse section taken along lines 4—4 of FIG. 2 in the direction of the arrows.

Description of preferred embodiment

Referring to FIG. 1, the fitting assembly shown therein includes an outer member 60 which may have any construction adapting it for a particular purpose in a given system. In the illustrated example the outer member 60, which is made of any suitable metal, has threads 62 enabling it to be connected to any other mating threaded element and it is formed with a tapped bore portion 64 enabling a threaded tube or the like to be connected to the bore shown at the left part of the outer member 60.

At its portion which is surrounded by the thread 62 the outer member 60 is formed with a bore 66 which is of a generally cylindrical configuration, as clearly indicated in FIG. 1.

The fitting includes an inner tubular member 68 which is adapted to extend with considerable clearance into the bore 66.

Also, the fitting includes the elongated compression sleeve 70 which initially has an inner cylindrical surface 72 of constant diameter. At its exterior the compression sleeve 70, which is also made of any suitable metal, has a pair of raised portions in the form of annular beads 74. At its right end, as viewed in FIG. 1, the sleeve 70 terminates in an outwardly directed flange 76. It is to be noted that while the compression sleeve 70 can be made of a softer metal than the outer member 60, this is not at all essential since with dimensions as illustrated in FIG. 1, the member 60 is so robust compared with the relatively thin walls of the compression sleeve 70 that even if these members are made of the same metal, it will be possible for the compression sleeve 70 to be deformed in a manner described below.

It is also to be noted that the maximum exterior diameters of the beads 74, before the sleeve 70 is introduced into the bore 66, is greater than the diameter of the bore 66, as indicated by the dot-dash lines in FIG. 1. On the other hand, the exterior surface of the inner tubular member 68 has a diameter which is slightly smaller than the inner diameter of the bore 72, so that the tube 68 can easily be slipped through the bore 72.

Referring to FIG. 2, it will be seen that when the parts are assembled the tube 68 is introduced into the bore 66 and the sleeve 70 is driven into the space between the tube 68 and the inner surface of the outer member 60 which defines the bore 66 therein. The sleeve 70 is driven in by applying any suitable tool with the required force against the right end face of the flange 76. Thus, the sleeve 70 can simply be hammered in with a few blows which need not be very forceful, or any suitable device may engage the threads 62 and the right end face of the sleeve 70 for pulling or pushing the latter into the position indicated in FIG. 2.

In either event, when the compression sleeve 70 is forced into the bore 66, because the diameter of the latter is less than the exterior maximum diameter of the beads 74, these raised portions or beads 74 of the sleeve 70 will be deformed inwardly with the result that the inner surface of the sleeve 70 will be deformed inwardly at the places where the beads 74 are inwardly compressed, resulting in the automatic formation at the interior of the sleeve of a pair of beads at the location where the exterior beads 74 are located. Such a pair of beads 80 are clearly apparent from FIG. 2, and these beads 80 are simply formed by the inward deformation of the exterior raised portions 74 of the sleeve 70. As a result, placing of the compression sleeve 70 in the assembled condition shown in FIG. 2 will automatically serve to deform the interior surface of the sleeve inwardly against the exterior surface of the inner tubular member 68 with the result that not only will the tube 68 be tightly fixed to the inwardly deformed surface portion of the compression sleeve 70, but, in addition, the exterior raised portions of the sleeve 70 will tightly press against the surface which defines the bore 66, and in this way an extremely secure fluid-tight connection between the outer member 60 and the inner member 68 is guaranteed. As is apparent from FIG. 3, a very tight connection is provided with the space between the exterior surface of the inner tube 68 and the surface which defines the bore 66 being completely and tightly filled by the annular deformed portion of the sleeve 70. On the other hand, at other locations where the sleeve is not deformed, it will have the clearance with respect to the inner and outer member, as clearly indicated in FIG. 4.

Thus, it will be seen that with the structure of the present invention a considerable simplification of a structure such as that shown at the right end of FIG. 1 is provided. It is not necessary to axially force the ends of a compression member toward each other so as to tend to reduce the size of its interior. Instead, simple insertion of a compression sleeve such as the sleeve 70 into a bore of suitable size will deform the interior sleeve surface inwardly against the exterior surface of the inner tubular member to provide a secure fluid-tight connection as described above.

As many changes could be made in the above compression fitting and many widely different embodiments of this invention could be made, it is intended that all matter combined in the above description shall be interpreted as illustrative and not in a limiting sense.

What is claimed is:

1. In a compression fitting, comprising
   an outer member formed with a first bore therein which bore is surrounded by a first wall;
   an inner hollow tubular member comprised of rigid material extending with clearance into said first bore;
   said inner tubular member being of a first exterior width;
   and a compression sleeve with a second bore passing completely therethrough, through which second bore said inner tubular member extends; said second bore being surrounded by a second wall and having a width approximating said first width, whereby when said inner tubular member is inserted into said second bore, said inner tubular member is securely engaged by said sleeve second wall when said sleeve is located in said first bore; said compression sleeve being formed of a resilient material that is sufficiently soft to deform under the pressure exerted thereon by said wall surrounding said first bore;
   the improvement comprising, said compression sleeve having on its exterior a first and a second annular, outwardly projecting bead, which beads are spaced a short distance apart along said sleeve; said beads initially having an exterior diameter greater than that of said first bore, whereby said beads are squeezed inward by said first surrounding wall when said sleeve is inserted in said first bore;
   said sleeve having a first vicinity next to said first bead and a second vicinity next to said second bead; said sleeve being so designed that said first vicinity is deformed outward when said first bead is squeezed inward and said second vicinity is deformed outward when said second bead is squeezed inward;
   said first bead being located within said second vicinity and said second bead being located within said first vicinity,
   whereby when one said bead is squeezed inward, the other said bead, being located in the vicinity of the one bead, is deformed outward, and thereby each said bead cooperates to hold the other said bead securely against said first surrounding wall;
   said beads also being deformed inwardly by said first surrounding wall to provide inwardly projecting annular beads which press against and hold said inner tubular member.

2. In the compression fitting of claim 1, the improvement further comprising,
   said compression sleeve having an end flange at the outward end thereof with respect to said first bore, by means of which said sleeve may be forced into said first bore.

3. In the compression fitting of claim 1, the improvement further comprising, said first bore being cylindrical.

4. In the compression fitting of claim 1, said inner tubular member extending out of both ends of said second bore.

5. In the compression fitting of claim 4, the improvement further comprising, said first bore being cylindrical.

References Cited

UNITED STATES PATENTS 885,836   4/1908   Bullock.
1,743,492   1/1930   Sipe.

(Other references on following page)

UNITED STATES PATENTS

| | | |
|---|---|---|
| 2,088,955 | 8/1937 | Hamill. |
| 2,468,985 | 5/1949 | Krotz. |
| 2,647,774 | 8/1953 | Newberry _____ 248—56 X |
| 2,717,792 | 9/1955 | Pelley. |
| 3,065,004 | 11/1962 | Laich _____ 16—2 X |
| 3,076,668 | 2/1963 | Famely _____ 85—82 X |
| 1,186,812 | 6/1916 | McFerran _____ 285—339 X |
| 3,339,949 | 9/1967 | Szohatzky _____ 285—382.7 X |

FOREIGN PATENTS

| | | |
|---|---|---|
| 735,846 | 8/1955 | Great Britain. |
| 179,688 | 9/1954 | Austria. |

CARL W. TOMLIN, *Primary Examiner*.

WAYNE L. SHEDD, *Assistant Examiner*.

U.S. Cl. X.R.

285—374, 356, 382, 345; 277—212, 208; 287—126, 20.3